Figure 11:
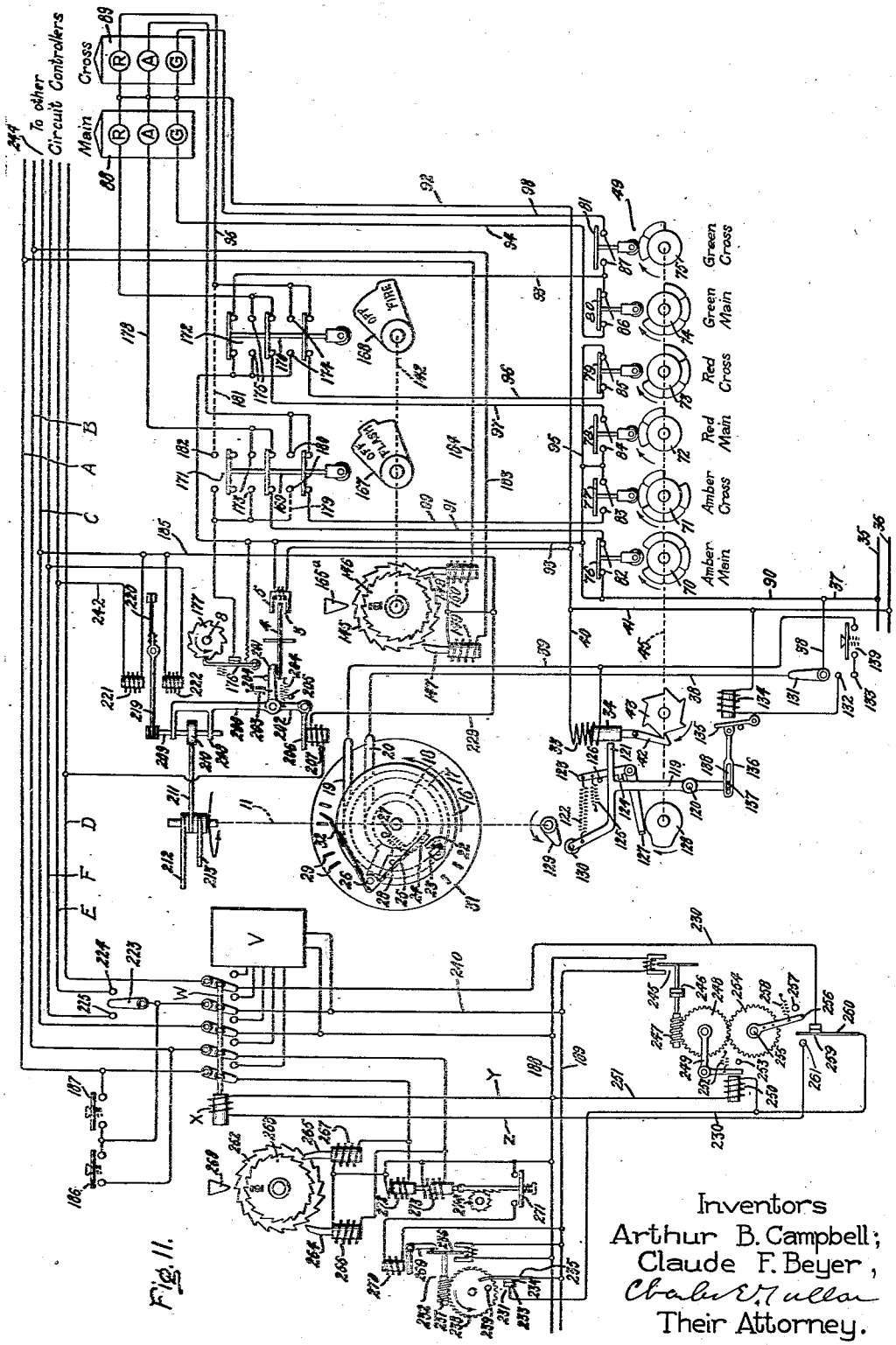

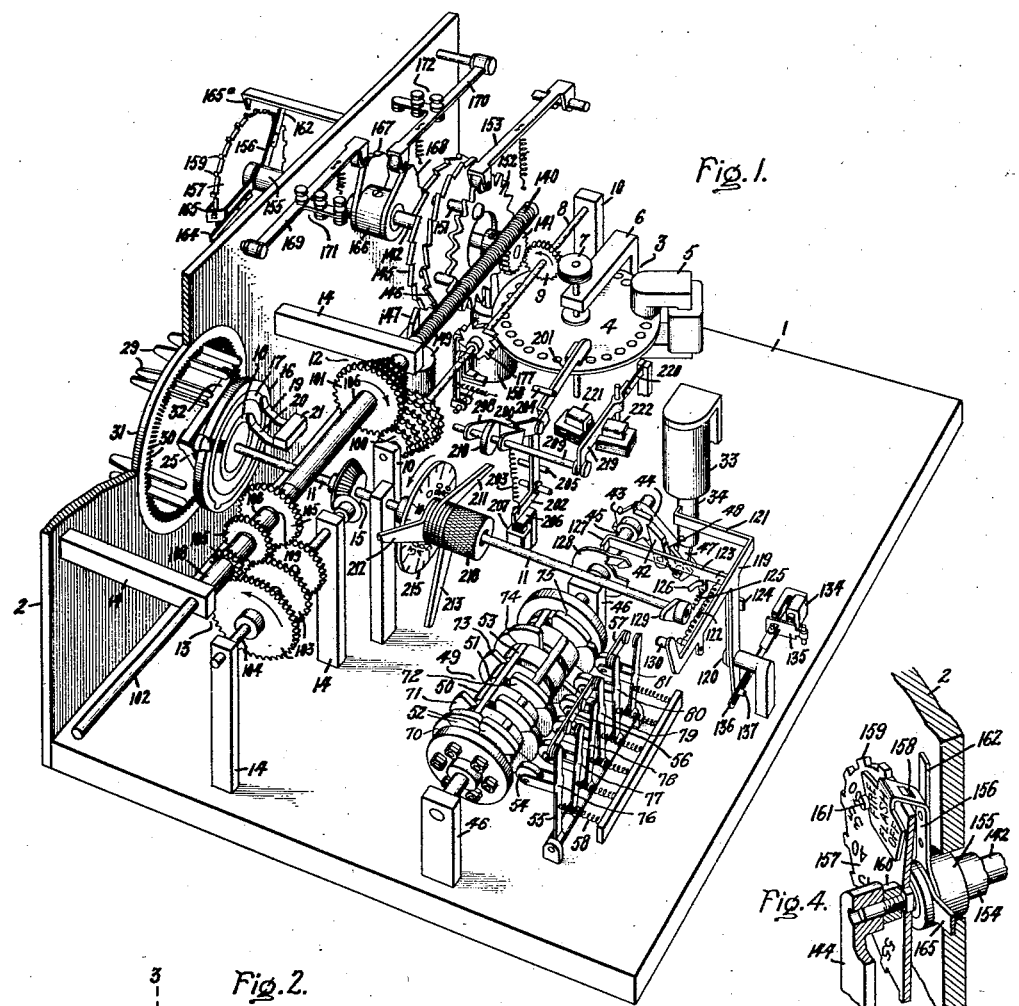

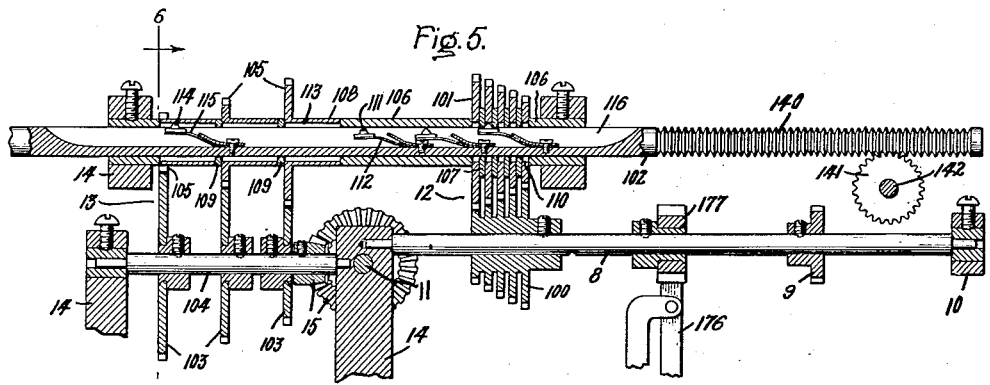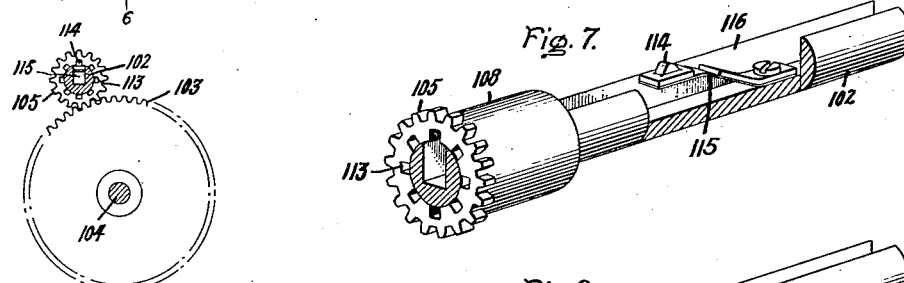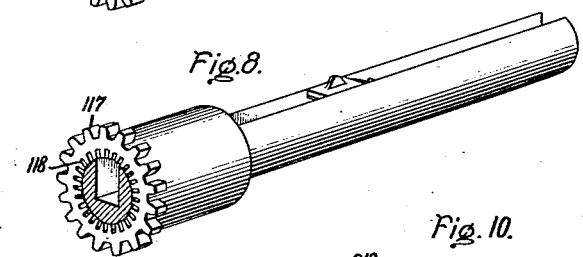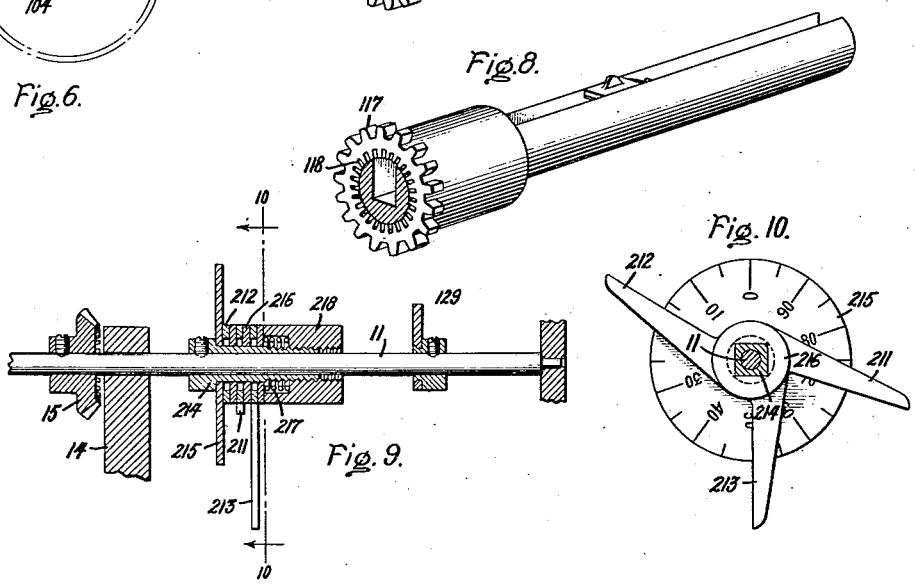

Inventors
Arthur B. Campbell;
Claude F. Beyer,
Their Attorney.

Patented Aug. 4, 1936

2,050,039

UNITED STATES PATENT OFFICE 2,050,039

SIGNALING SYSTEM AND CIRCUIT CONTROLLER FOR USE THEREIN

Arthur B. Campbell and Claude F. Beyer, Fort Wayne, Ind., assignors to General Electric Company, a corporation of New York Application February 28, 1931, Serial No. 519,198

25 Claims. (Cl. 177—337)

The present invention relates to signaling systems and circuit controllers for use therein. It relates particularly to signaling systems and circuit controllers for use in controlling street traffic, although the invention is not limited thereto necessarily.

The object of the invention is to provide an improved signaling system and an improved circuit controller which may be used in and form a part of the signaling system, and for a consideration of what we believe to be novel and our invention, attention is directed to the following specification and the claims appended thereto.

In the drawings, Fig. 1 is a perspective view of a somewhat diagrammatic character illustrating a circuit controller embodying the invention; Fig. 2 is a face view with parts broken away showing the front of the circuit controller; Fig. 3 is a detail sectional view through certain parts, the section being taken on line 3—3, Fig. 2; Fig. 4 is a detail perspective view of certain parts; Fig. 5 is a detail sectional view of a gear shifting mechanism; Fig. 6 is a sectional view taken on line 6—6, Fig. 5; Fig. 7 is a detail perspective view, partly broken away, of one of the shafts of the gearing; Fig. 8 is a view similar to Fig. 7 showing a modification; Fig. 9 is a detail sectional view of parts of a reset mechanism; Fig. 10 is a sectional view taken on line 10—10, Fig. 9; and Fig. 11 is a diagrammatic view, including a wiring diagram, of a circuit controller and signaling system.

Referring first to Fig. 1 of the drawing, 1 indicates the base of the casing of the circuit controller and 2 indicates the front wall, or panel, thereof. The remaining portion of the casing is not shown in the drawings. The several parts of the circuit controller are supported on the base 1 and the front wall 2 of the casing. The circuit controller is driven by a suitable motor 3, here shown as a synchronous disk motor comprising a disk 4 and a suitable number of shaded pole magnets 5, only one of which is shown in the drawings. 6 indicates a supporting frame for the rotating disk 4. This may be a motor such as that shown in the patent to Hall 1,668,365, May 1, 1928. On the shaft which carries disk 4 is a worm 7 which drives a shaft 8 through a worm wheel 9. Shaft 8 is rotatably mounted in suitable bearing posts 10. It is connected to drive a shaft 11 through a double reduction gearing comprising sets of gears 12 and 13, carried by shafts mounted in suitable bearing supports 14, and beveled gears 15. The sets of gears 12 and 13 form a change-speed gear mechanism whereby the speed at which motor 3 drives shaft 11 may be changed. The details of the gear shifting mechanism are shown in Figs. 5 to 8 inclusive, and are described more fully hereafter.

Fixed on shaft 11 is a disk 16 of insulating material which carries two concentric contact rings 17 and 18. Engaging these contact rings is a pair of brushes 19 and 20 carried by a block of insulating material 21. Carried by disk 16 and rotating therewith is an adjustable contact 22 (Figs. 2 and 11) carried by a post 23 fixed to disk 16 and a contact 24 carried by a bell crank lever 25 pivoted on disk 16 as is indicated at 26. A spring 27 normally holds bell crank lever 25 in engagement with a fixed stop 28 carried by disk 16, the spring holding the contacts 22 and 24 separated. Contacts 22 and 24 are connected respectively to the annular contact rings 17 and 18, the arrangement being such that when contact 24 engages contact 22 the brushes 19 and 20 are connected together. Contact 24 is adapted to be moved into engagement with contact 22 by a series of keys 29 adapted to be inserted through slots 30 in a face plate 31 fastened in an opening in front wall 2. When keys 29 are placed in the openings their inner ends extend into a position to engage a spring tip 32 on an arm of bell crank lever 25. As disk 16 revolves in the direction indicated by the arrow in Fig. 2, the spring contact tip 32 is brought successively into engagement with the inner ends of the keys 29 so that as the tip passes each key the contact 24 is moved into engagement with the contact 22 for a short interval of time. Disk 16 and the contacts carried by it, form a rotating circuit closer, the closing of which can be timed by varying the positions of the actuating keys 29.

Referring now to Fig. 11, brushes 19 and 20 are connected in circuit with the winding 33 of a solenoid, the plunger of which is indicated at 34. Whenever contact 24 engages contact 22, a circuit is closed through winding 33 of the solenoid from a source of power indicated by the lines 35 and 36, as follows: line 35, conductor 37, conductor 38, brushes 20 and 19, conductor 39, solenoid winding 33, conductor 40 and conductor 41 to line 36. Each time solenoid winding 33 is energized it raises its plunger 34 and through a pawl 42 turns a ratchet wheel 43 one notch. As shown in Fig. 1, pawl 42 is pivoted on an arm 44 loosely mounted on a shaft 45 carried in bearing brackets 46. Ratchet wheel 43 is fixed on shaft 45, the pawl and ratchet wheel forming the means for turning shaft 45. Arm 44 is connected at one end to plunger 34 by a link 47. At 48 is a spring which presses pawl 42 into engagement with ratchet wheel 43. Mounted on shaft 45 is a contact actuating drum or circuit controller member 49 which controls the several circuits leading to the signaling devices which may be, for example, lamps arranged in a casing and operated in suitable sequence to display different colored signals. The usual arrangement of signals is a red signal to indicate "Stop", a green signal to indicate "Go", and an amber signal which is displayed to indicate that the signals are about to be changed. This is the type of signaling arrangement illustrated in the drawings, Fig. 11.

The controller drum comprises a series of spaced disks 50, carried by shaft 45 and providing between them annular slots 51 in which are arranged cams, each cam comprising a number of cam segments 52. In the present instance the ratchet wheel 43 is shown as having six teeth and to correspond therewith cam segments 52 are made of a circumferential length so that each forms one-sixth of a circle. With this arrangement, upon each actuation of shaft 45 by solenoid winding 33 and pawl 42, drum 49 is turned a distance equal to one cam segment, i. e., one-sixth of a revolution. It will be understood, of course, that different numbers of teeth may be used on the ratchet 43 and corresponding different sizes of cam segments 52 may be utilized to meet any desired operating conditions.

The cam segments are held in position in slots 51 by rods 53 which pass through slots in disks 50 and through holes in the segments, the nuts on the ends of rods 53 being screwed up tight to provide a rigid structure. Any suitable number of cam segments may be arranged in each slot. For the particular signaling sequence illustrated in the drawings, the cam segments are arranged in the slots as is shown diagrammatically in Fig. 11, there being five cam segments in each of the first two slots, two cam segments in the third slot, four cam segments in each of the fourth and fifth slots, and two cam segments in the sixth slot. The space where a cam segment or segments are omitted indicates a space in which a signaling circuit is closed, and these spaces are arranged relatively to each other to give the desired signaling sequence.

The cams engage rollers 54 carried by contact arms 55 and are adapted to move the contacts on the contact arms from engagement with fixed contacts carried by the contact strips 56 and 57. Compression springs 58 serve normally to hold the contacts in engagement with each other.

Referring to Fig. 11, 70, 71, 72, 73, 74 and 75 indicate the six cams carried by the contact drum; 76, 77, 78, 79, 80 and 81 indicate the six movable contacts, and 82, 83, 84, 85, 86 and 87 indicate the six stationary contacts. 88 and 89 indicate the main street and cross-street signals each comprising a red, amber and green signal light, indicated respectively "R", "A" and "G". The cam 70 controls the amber on the main signal, the cam 71 controls the amber on the cross signal, the cam 72 controls the red on the main signal, the cam 73 controls the red on the cross signal, the cam 74 controls the green on the main signal, and the cam 75 controls the green on the cross signal. In the position of the parts shown in Fig. 11, the green on the main signal and the red on the cross signal are lighted and the amber on the main signal is lighted, indicating that the signals are about to change. The circuit for the amber on the main signal is as follows: Supply line 35, conductor 37, conductor 90, contact 76, conductor 91, amber on the main signal, and common return conductor 92 and conductor 41 to supply conductor 36. The circuit for the green on the main signal is as follows: conductor 37, conductor 90, conductor 93, contact 80, conductor 94, main green signal, and common return conductor 92. The circuit for the red on the cross signal is as follows: Conductor 37, conductor 90, conductor 95, contact 79, conductor 96, cross red signal and common return conductor 92. Upon the next actuation of solenoid 33, which effects a turning of shaft 45 one-sixth of a revolution in the direction indicated by the arrows in Fig. 11, the circuit on the main amber will be opened due to cam 70 lifting contact 76, the circuit on the cross red will be opened due to cam 73 lifting contact 79, and the circuit on the main green will be opened due to cam 74 lifting contact 80. At the same time, the movement of cam 72 will permit contact 78 to engage contacts 84, thereby closing the circuit on the main red, and the movement of cam 75 will permit contact 81 to engage contacts 87, thereby closing the circuit on the cross green. The circuits through these signals include the conductors 97 and 98 respectively and will be clear from the circuits already traced. The signal circuits will remain in this condition for the next two actuations of solenoid 33 and then upon the fourth actuation of solenoid 33, cam 71 will have been moved to a position to permit contact 77 to engage contact 83, thereby lighting the cross amber through a circuit including conductor 99, and the cross amber will burn along with the main red and the cross green, indicating that a change in signals is about to take place. Upon the next actuation of solenoid 33, the cross amber and cross green will be extinguished and the main green and cross red lighted. On the next actuation of solenoid 33, the cams will assume again the positions shown in Fig. 11. Thus it will be seen that as disk 16 rotates, effecting successive movements of contact 24 into engagement with contact 22, controller drum 49 will have imparted to it a step-by-step turning movement to effect successively the cycle of operation of the signal lights.

By adjusting the cam segments of the respective cams relatively to each other, the desired sequence of operation of the signals may be obtained.

By adjusting the keys 29 in the slots 30, the division of the time intervals among the signals can be adjusted with a considerable degree of precision, the degree depending upon the closeness together of the slots 30. In other words, for any time cycle, the keys may be adjusted to give the desired division of such time cycle among the respective signals.

By the use of the adjustable cam segments and the adjustable keys, great flexibility in the adjustment of the sequence and the timing of the red, green and amber signals relatively to each other may be obtained.

In addition to changing the relative timing of the signals, it is desirable also to change the length of the total cycle. This is accomplished by means of the change-speed gearing comprising the sets of gears 12 and 13.

The set 12 comprises a series of gears 100 of different diameters rigidly mounted on shaft 8, which may be termed a driving shaft, and a series of gears 101 which are carried by an intermediate shaft 102 and mesh with gears 100. The set 13 comprises a series of spaced gears 103 of different diameters rigidly mounted on a shaft 104, and a series of gears 105 which are carried by intermediate shaft 102.

Gears 100 and 103 are permanently fixed to their respective shafts 8 and 104 so that they all always turn therewith. The two series of gears 101 and 105 are loose on shaft 102 but are capable of being locked to the shaft selectively by means which will now be described.

Referring particularly to Figs. 5, 6 and 7, gears 101 are mounted on shaft 102 between two collars 106 which surround shaft 102, there being spacers 107 between the gears. The gears are loosely held so that each is free to turn on shaft 102 when it is not locked to the shaft. The gears 105 are each provided with relatively long integral sleeves 108 which hold the gears in spaced relation to each other, there being spacing collars 109 on the shaft between the gears and also between the left-hand gear 105 and the adjacent bearing bracket. Gears 101 are provided with circumferentially spaced notches 110 in their bores adapted to be engaged by lugs 111 on the ends of spring fingers 112. Likewise, the sleeves 108 are provided with circumferentially spaced slots or keyways 113 in their bores adapted to be engaged by a lug 114 on the end of a spring finger 115. Spring fingers 112 and 115 are carried in a longitudinally extending slot 116 in shaft 102, being fastened in position by means of suitable studs.

Shaft 102 is adapted to slide axially in its bearing brackets and as it is moved the lugs on the spring fingers 112 and 115 are brought into engagement with the notches and keyways in the gears 101 and the sleeves 108, thereby locking the gears and the sleeves to the shaft. The spring fingers 112 and 115 with the lugs thereon thus function as spring locking keys, the springs having sufficient flexibility to permit of the movement from gear to gear. As shown in Fig. 5, the left-hand gear 105 is locked to shaft 102 by spring finger 115 and the next to the left-hand gear 101 is locked to shaft 102 by the right-hand spring finger 112. The drive from shaft 8 to shaft 104 is thus through these two gears which are locked to shaft 102. As shaft 102 is moved successive steps toward the right, the gears 101 will be successively locked to shaft 102 by the right-hand spring finger 112, spring finger 115 remaining in engagement with sleeve 108 of left-hand gear 105. The lengths of sleeves 108 and of gears 101 are such that, upon continued movement of shaft 102 toward the right, as right-hand spring finger 112 leaves the right-hand gear 101, middle spring finger 112 engages the left-hand gear 101 and spring finger 115 moves from engagement with the sleeve of left-hand gear 105 into engagement with the sleeve of middle gear 105. Upon continued movement of shaft 102 toward the right, each of the gears 101 may be successively locked to shaft 102 along with middle gear 105, after which by means of the left-hand spring finger 112, each of the gears 101 may be locked to shaft 102 along with right-hand gear 105. Thus it will be seen that by shifting shaft 102 axially, any one of the gears 101 may be utilized with any one of the gears 105 to form a driving connection. There is thus obtained with a comparatively simple construction a large number of different gear ratios.

The number of notches 110 in gears 101 and the number of keyways 113 in sleeves 108 may be varied as found desirable. For example, in Fig. 8, the gear 117 corresponding to a gear 105 in Fig. 7, is shown as having its sleeve provided with keyways 118 spaced closer together than are the keyways 113.

As explained hereinafter, there is provided means which may be located at any suitable point, such as at a central station, for moving shaft 102 axially to change the gear ratio.

It is desirable to maintain a definite relationship between the rotating circuit closer comprising contacts 22 and 24, and the controller drum 49, and for this purpose we provide means which, in case the drum gets out of step with the circuit closer, functions to hold the drum stationary until the correct relation again obtains, and then releases the drum. For this purpose there is provided a locking lever 119 (Figs. 1 and 11) pivoted at 120 and provided with a locking finger 121 adapted to move beneath solenoid plunger 34 to hold it from movement. A spring 122 it attached to lever 119 and tends to move it on its pivot to bring finger 121 under plunger 34. The lever is held from movement by a holding lever 123 suitably pivoted adjacent lever 119, for example on the same pivot 120, and provided with a lug 124 which stands in the path of movement of lever 119. Holding lever 123 is held in a position to hold locking finger 121 away from plunger 34 by a spring 125, movement of the holding lever being limited by a stop 126. One end of spring 122 may be attached to lever 123. An end 127 of holding lever 123 stands in the path of movement of a cam 128 on controller drum shaft 45 and with each revolution of shaft 45, cam 128 engages the end 127 of holding lever 123 and moves lug 124 away from locking lever 119, thus leaving the locking lever free to move finger 121 beneath plunger 34. On shaft 11 is a cam 129 which rotates with shaft 11 in a plane in line with a roller 130 on an end of lever 119. The arrangement is such that if the rotating circuit closer and its shaft 11 are in the desired relation to the controller drum 49 and its shaft 45, at the time cam 128 moves holding lever 123 to release locking lever 119, cam 129 stands in front of roller 130 to prevent movement of locking lever 119. As a result nothing happens except that cam 128 moves holding lever 123 and releases it again. If, however, at the time cam 128 moves holding lever 123, cam 129 is not in front of roller 130 (a thing which happens when the desired relation between the circuit closer and the controller drum does not obtain) then when plunger 34 is raised, finger 121 will move beneath the plunger and hold it, with the result that the plunger is held from further actuating the controller drum. Shaft 11 continues to revolve and when cam 129 reaches roller 130 it will engage it and turn lever 119 to move locking finger 121 from beneath plunger 34, thus permitting the plunger to again function to turn the controller drum 49, the circuit closer and drum then starting off with the desired definite relation between them.

With this arrangement, the relative definite relation between the rotating circuit closer and the controller drum is continuously checked and automatically maintained. Also it will be noted that adjusting the keys 29 to change the relative durations of the red, green and amber signals does not in any way affect the definite relation between the rotating circuit closer and the controller drum.

It is desirable sometimes, in the case of an automatic signaling device, to change from automatic control to manual push button control.

For this purpose there is provided a switch 131 which may be moved to open the automatic control circuit and to close circuits including contacts 132 and 133. Engagement with contact 132 closes a circuit through an electromagnet 134 which pulls its armature 135 toward the right and thereby brings the end of a holding link 136 to a position wherein it holds locking lever 119 in inoperative position, the lower end of lever 119 being provided with a pin 137 which stands in an elongated slot 138 in link 136. Engagement with contact 133 places a push button 139 directly in circuit with solenoid winding 33. Switch 131 and push button 139 may be located at any desired point, and enable an officer or other authorized person to operate the signals manually with any desired time relation. This is done by successively closing push button 139 to energize solenoid 33 and effect step-by-step turning movements of the controller drum. After having been operated on manual control the signals may be put back on automatic control by reversing the position of switch 131. When returned to the automatic control the rotating circuit closer and the controller drum will be brought automatically to the desired definite relationship in the manner already explained.

As stated above, means are provided for moving shaft 102 axially step by step to change the gears between driving motor 3 and the rotating circuit closer. This means comprises circular teeth 140 on shaft 102 with which meshes a gear 141 carried by a shaft 142. Shaft 142 is journaled at one end in a post 143 supported by base 1, and at the other end in a bracket 144 carried by front wall 2 of the casing (see Figs. 3 and 4). Step by step movement in either direction is imparted to shaft 142 by two ratchet wheels 145 and 146 having oppositely facing teeth adapted to be engaged by pawls 147 and 148 carried by the plungers of electromagnets 149 and 150. When electromagnet 149 is energized pawl 147 engages a tooth of the ratchet wheel 145 to turn shaft 142 one step in one direction, and when electromagnet 150 is energized pawl 148 engages a tooth of ratchet wheel 146 to turn shaft 142 one step in the other direction. Connected to ratchets 145 and 146 by means of rivets 151 is a sprocket wheel 152 having teeth with which engage a roller on the end of a spring pressed arm 153 suitably pivoted on the casing of the circuit controller. The sprocket wheel and spring pressed roller serve definitely to define the extent of each step by step movement.

Ratchet wheels 145 and 146 are carried by a sleeve 154 loosely mounted on shaft 142 and terminating at its forward end adjacent bracket 144 but short thereof. On the end of sleeve 154 is fastened a hub 155 to which is attached a spring latch 156 which projects over the periphery of a disk 157 and is provided with an opening 158 adapted to engage over teeth 159 on disk 157. Disk 157 is attached to the end of shaft 142 by means of a squared end on the shaft engaging a correspondingly shaped opening in the disk, a nut 160 (Fig. 4) serving to hold disk 157 in position. Engagement of a tooth 159 in slot 158 serves to lock spring latch 156 to the disk, thereby locking ratchet wheels 145 and 146 and sleeve 154 to disk 157 and hence to shaft 142, so that all these parts turn together. The end of spring latch 156 is bent down over the outer face of disk 157 and carries on its face the indicia "Fire", "Flash", "Off". On disk 157 is a stop pin 161 which stands in the path of movement of the bent-down end of latch 156. Carried by spring latch 156 at the rear of disk 157 is a stop finger 162. Stop finger 162 is adapted to engage a stop 163 carried by front wall 2 of the casing. Carried by disk 157 is an adjustable stop 164 which also is adapted to engage fixed stop 163. Stop 164 is carried by a spring arm 165 which is loosely mounted at one end on shaft 142, its other end being bent over the periphery of disk 157 in a manner similar to that in which arm 156 is arranged and being provided similarly with an opening with which teeth 159 engage. The bent over end stands in line with stop pin 161 which limits its adjustment in one direction. Stops 164 and 162 serve to limit the turning movement of shaft 142 in each direction and may be adjusted any desired distances from fixed stop 163, being the maximum distances from fixed stop 163 when both are in engagement with stop pin 161.

On the face of disk 157 are numerals indicative of the several gear ratios and above the disk is a pointer 165$^a$ which indicates the adjustment.

It is desirable to be able to temporarily render a circuit controller inoperative, to connect it so that it shows only one signal continuously. This latter may be desirable in case of fire, for example, when it may be desired to display the red lights on both the main and cross street signals, thereby stopping all traffic and giving right of way to the fire apparatus. The mechanism for accomplishing these results will now be described.

Carried by sleeve 154 is a hub 166 on which are two cams 167 and 168 having cam surfaces marked "Off", "Flash" and "Fire". Cams 167 and 168 are adapted to engage spring arms 169 and 170 to actuate circuit closers comprising contacts indicated in Fig. 1 generally at 171 and 172. When the cam surfaces marked "Off" engage spring arms 169 and 170, the arms are moved up one step and when the cam surfaces marked "Flash" and "Fire" engage arms 169 and 170, the arms are moved up a second step. The purpose of contacts 171 and 172 is to control certain circuits whereby the circuit controller may be rendered inoperative in so far as operating the signals is concerned, whereby it may be set for a continuously flashing signal, or whereby it may be set for all red signals, to indicate a fire.

Referring particularly to Fig. 11, it will be seen that contacts 171 are arranged so that when cam 167 moves arm 169 up one step, circuits including the conductors 91 and 99 are opened, and when moved up a second step a circuit across contacts 173 is closed. Likewise, contacts 172 are arranged so that when cam 168 moves spring arm 170 up one step circuits including the conductors 93, 96 and 97 are opened, and when moved up a second step circuits are closed across contacts 174 and 175. Contacts 173 are connected to a circuit closer 176 adapted to be continuously opened and closed by a ratchet wheel 177 carried by shaft 8, and with the amber light of the main street signal. The two cams 167 and 168 are carried by the same hub and move together to simultaneously engage spring arms 169 and 170. When cams 167 and 168 first engage spring arms 169 and 170, raising them one step by means of the cam surface marked "Off", the spring arms open the circuits including the conductors 91, 99 and the conductors 93, 96 and 97, thus opening the circuits for all the signal lights and rendering the signals inoperative. If now cams 167 and 168 are moved a second notch toward the left, as indicated in Fig. 11, the cam surfaces marked "Flash" engage spring arm 169, raising the spring arm another step and closing the circuit across contacts 173. The spring arm 170 remains in the same position, being still engaged by the "Off" surfaces of cam 168. The closing of a circuit across contacts 173 closes a circuit on the main amber light which may be traced as follows: Supply line 35, conductor 37, conductor 90, conductor 93, circuit closer 176, contacts 173, conductor 178, main amber and common return conductor 92. The continuously rotating ratchet wheel 177 will continuously open and close this circuit, thereby flashing continuously the main amber signal. If it is desired to flash the amber signal on both the main and cross streets, then a circuit connection as indicated by the dotted lines 179 may be installed, which serves to close a circuit through the pair of contacts 180 in parallel with contacts 173, and including the cross amber signal. If it is desired to flash the cross red signal, a circuit connection indicated by the dotted lines 181 may be installed, thereby placing the pair of contacts 182 in circuit with the circuit closer 176 and the cross red signal. As will be clear, by suitable arrangement any combination of the main and cross street signal lights may be placed in circuit with the flashing circuit closer.

If the cams 167 and 168 are moved another notch or step toward the left as shown in Fig. 11, spring arm 171 drops off of the "Flash" portion of cam 167 to the right-hand "Off" portion and the "Fire" portion of cam 168 raises spring arm 170 up another step, thereby closing circuits across contacts 174 and 175. This closes circuits on the main red and cross red lights as follows: Supply line 35, conductor 37, conductor 90, conductor 93, contacts 175 to main red signal and contacts 174 to cross red signal and conductor 92 to supply line 36. As long as the cams remain in these positions the main and cross red lights will burn continuously.

The solenoid windings 149 and 150 are connected by conductors 183 and 184 and a common conductor 185 to push buttons 186 and 187, the connections including cable conductors A, B and C and the supply lines 188 and 189. The push buttons 186 and 187 may be located at any desired point. For example, they may be located at a central station. Operation of push button 186 energizes electromagnet 149, thereby turning shaft 142 step by step in a clockwise direction as viewed in Fig. 11, and operation of push button 187 energizes solenoid winding 150 to turn shaft 142 step by step in a counter-clockwise direction.

In most installations it will not be desired to use all the possible different gear ratios and to take care of this situation the two stops 162 and 164 are adjusted on the disk 157 for the desired range. The adjustment of stop 162 adjusts also the cams 167 and 168 so that when the pointer 165a points to "Off", "Flash" or "Fire", on the inturned end of spring arm 156, the cams 167 and 168 occupy corresponding positions with respect to the spring arms 169 and 170. When it is desired to adjust the circuit controller for "Off", "Flash" or "Fire" operation, the push button 187 is successively actuated to turn shaft 142 so as to bring cams 167 and 168 to the desired position, the indicia on the inturned end of spring latch 156 indicating the adjustment. Thus by means of the push buttons 186 and 187, the desired gear ratio can be obtained or the circuit controller may be adjusted to "Off", "Flash" or "Fire" position.

When the circuit controller is used with other circuit controllers in an interconnected progressive system, for example, it is required that all the controllers be maintained in a fixed phase or time relation relatively to each other. Also, it is desirable that means be provided whereby the relative phase relations among the circuit controllers of the interconnected progressive system may be changed from a central point. The circuit controller comprises means whereby when used in an interconnected progressive system it is periodically checked with a master controller and, if out of step, reset in accordance with the master controller. The circuit controller comprises also means whereby its phase relation relatively to other circuit controllers connected with it in an interconnected progressive system may be adjusted for a plurality of different timed relations.

For periodically checking the phase relation of the circuit controller and resetting it if it is out of step, there is provided a stopping means for the circuit controller which stopping means is controlled by a master controller. Periodically the locking means is actuated by the master controller but if the circuit controller is in step the stopping means is ineffective and does not stop the circuit controller. If, however, the circuit controller is out of step, the stopping means stops the circuit controller and holds it until it is again in step, when the circuit controller is permitted to operate again. The circuit controller may be stopped by disconnecting it from the driving motor, by stalling the driving motor or by other suitable means. In the present instance there is illustrated an arrangement for stalling the driving motor. For this purpose there is provided a locking means which is actuated periodically by the master controller and which tends to lock the driving motor. If the circuit controller is in step the locking means is rendered ineffective. If, however, the circuit controller is out of step, the locking means stalls the driving motor and holds it until the circuit controller is again in step, when the locking means is released and the circuit controller is again permitted to operate.

Referring particularly to Figs. 1 and 11, the locking means comprises a bell crank brake lever 200 having an end 201 provided with a friction pad adapted to engage disk 4 of motor 3 to stop the motor. Bell crank brake lever 200 is pivotally mounted at its elbow on one arm of a second bell crank lever 202. At 203 is a spring connected to an arm of bell crank lever 200 and serving normally to hold the lever against a stop 204, in which position end 201 is out of engagement with disk 4. Spring 203 is connected also to an arm of bell crank lever 202 (see Fig. 1) and serves normally to hold bell crank lever 202 against a stop pin 205. (In Fig. 11 spring 203 is diagrammatically shown as two separate springs, one for each lever.) On bell crank lever 202 is an armature 206 arranged in operative relation to an electromagnet 207, which may be termed a brake magnet. When electromagnet 207 is energized, bell crank lever 202 is held away from stop 205 as shown particularly in Fig. 11, and when it is deenergized the spring pulls it over into engagement with stop 205. On one arm of bell crank lever 200 are furcations 208 in which is slidably mounted a shaft 209 on which is fixed a roller 210. Roller 210 is adapted to stand in the path of movement of any one of three arms 211, 212 and 213, adjustably mounted on shaft 11. The detail structure of the mounting is shown in Figs. 9 and 10. Referring particularly to Fig. 9, there is fixed on shaft 11 a hub 214 having a squared portion on which the arms 211, 212 and 213 are mounted in spaced relation between a disk 215 and spacing washers 216. The arms are held in frictional engagement with the spacing washers by means of a spring 217 housed in a recess in a knurled nut 218 threaded on the end of hub 214. By loosening nut 218 the arms 211, 212 and 213 may be moved readily to any desired positions relatively to each other and then fastened in such positions by tightening the nut. On one face of disk 215 are indicia (Fig. 10) for indicating the adjustment of arms 211, 212 and 213.

Connected to one end of shaft 209 (Figs. 1 and 11) is an armature 219 carried by a leaf spring 220 which serves normally to hold the armature centrally between two electromagnets 221 and 222. When armature 219 is located centrally between the electromagnets 221 and 222, roller 210 stands in line with the path of movement of arm 211. When electromagnet 221 is energized, armature 219 is moved to bring roller 210 in line with the path of movement of arm 212, and when electromagnet 222 is energized armature 219 is moved to bring roller 210 in line with the path of movement of arm 213. Electromagnets 221 and 222 are connected in circuit with a reset or progressive selector switch 223 which may be located at a central station. When switch 223 is moved into engagement with its contact 224 a circuit is closed through electromagnet 221, and when the switch is moved into engagement with its contact 225 a circuit is closed through electromagnet 222. These circuits are described more fully hereinafter.

Brake magnet 207 is normally energized, and when energized holds bell crank lever 202 away from stop 205. If, while brake magnet 207 is energized one of the arms, such as the arm 211, engages roller 210, it turns bell crank lever 200 on its pivot to bring the end 201 of the bell crank brake lever into engagement with disk 4 to stop the driving motor. If, however, at the time arm 211 engages roller 210, brake magnet 207 is deenergized so that bell crank lever 202 is in engagement with stop 205, then, due to the movement of the fulcrum point of bell crank brake lever 202 toward the right, (Fig. 11), the turning movement of bell crank brake lever 200 effected by arm 211 is not sufficient to bring the end 201 of brake lever 200 into locking engagement with disk 4. Therefore, when one of the arms 211, 212 or 213 engages roller 210 to move bell crank lever 200, whether the driving motor 3 is stopped depends upon whether brake magnet 207 is energized or deenergized. Brake magnet 207 is connected in circuit with the source of electrical energy represented at 188, 189 as follows: Line 189, conductor 230, cable conductor D, winding of brake magnet 207, conductor 229, conductor 185 and cable conductor C, to line 188. In conductor 230 is a circuit closer 231 which is controlled by a master timer or controller 232. Circuit closer 231 comprises a fixed contact 233 and a movable contact 234 carried by a leaf spring 235. The master timer or controller comprises a synchronous induction disk motor 236 which may be similar to the motor 3. On the shaft of the motor is a worm 237 which drives the worm wheel 238. On the worm wheel is a pin 239 adapted to engage leaf spring 235 to move contact 234 away from contact 233, thereby opening the circuit on brake magnet 207. The master timer or controller may be located at a central station and is used to control the timing of all the signals connected in the progressive system. If at the time arm 211 engages roller 210 to turn brake lever 200 toward locking position, pin 239 simultaneously engages leaf spring 235 to open the circuit on brake magnet 207, then for the reasons already explained the driving disk 4 of motor 3 is not stopped, since the simultaneous movement of brake lever 200 and the opening of circuit closer 231 indicates that the circuit controller is in synchronism with the master timer or controller. If, however, at the time arm 211 engages roller 210, pin 239 is not in the position to open circuit closer 231, then brake lever 200 will be turned to bring end 201 into engagement with disk 4, thereby stopping motor 3. The motor will be held stopped until pin 239 engages spring 235 and opens circuit closer 231, whereupon brake magnet 207 will be deenergized and, due to the turning of bell crank lever 202, the end 201 of brake lever 200 will be moved away from disk 4, thereby releasing it and permitting motor 3 to again start in proper synchronism.

A number of circuit controllers as shown in Fig. 1 may be connected in parallel with each other and with a common master controller. The arms 211, 212 and 213 of each of the circuit controllers may be set for the desired phase or time relation among the circuit controllers. The arms 211 of all the circuit controllers may be set relatively to each other for one phase relation, the arms 212 of all the circuit controllers may be set for a second phase relation, and the arms 213 of all the circuit controllers may be set for a third phase relation. The electromagnets 221 and 222 of all the circuit controllers will be connected in parallel with the reset or progressive selector switch 223.

Assume that all the circuit controllers of an interconnected system are operating with a certain phase or time relation set by the arms 211, the selector switch 223 being in the neutral position, and that it is desired to change them to the phase relation set by the arms 212. To effect this result, reset or progressive selector switch 223 is moved into engagement with contact 224. This closes a circuit from line 189 through conductor 240, contact 224, cable conductor E, conductor 242, electromagnet 221, conductor 185 and cable conductor C, to line 188, similar circuits being closed through all the circuit controllers connected in parallel in the system. Electromagnets 221 of all the circuit controllers then will be energized, each armature 219 being moved toward its electromagnet 221 to bring roller 210 into line with arm 212. Now as the arms 212 are brought successively into engagement with the rollers 210, the motors 3 of the respective circuit controllers will be stopped, and finally when pin 239 of the master controller reaches leaf spring 235 and opens circuit closer 231 all the circuit controllers in the system will be started simultaneously in the new phase or time relation.

Similarly, by moving circuit closer 223 into engagement with contact 225 the electromagnets 222 may be energized over cable conductor F to bring rollers 210 of all the circuit controllers into line with arms 213, whereby the phase relation for which the arms 213 are set may be obtained.

It will be seen that with the arrangement shown, three settings or selector positions of the signals of the system may be obtained. It will be understood, however, that a greater or fewer number of settings may be provided if found desirable.

In Fig. 11, 244 indicates the extensions of the cable conductors leading from the central station where master timer or controller 232 is located to the several circuit controllers connected in the system with the circuit controller shown.

If the master timer or controller should stop with its re-synchronizing contacts 233 and 234 closed, all the circuit controllers connected in the system would be stopped. This would be undesirable and to avoid its occurrence there is provided what may be termed a protective relay which operates in case the master timer stops with its re-synchronizing contacts closed to open the master control circuit whereby the brake magnets 207 of all the circuit controllers will be deenergized, thus rendering inoperative the brake levers for each of the motors 3. This permits each circuit controller to continue to operate independently of the master timer and of the other circuit controllers.

Referring particularly to Fig. 11, the protective relay comprises a synchronous disk motor 245 connected in parallel with the master timer 232. The shaft of motor 245 is connected through a friction clutch 246 of any suitable type to a worm 247 which meshes with a worm wheel 248 journaled on one arm of a bell crank lever 249, suitably pivoted at its elbow. The other arm of bell crank lever 249 forms an armature for an electromagnet 250 which is connected to power lines 189 and 188 by conductor 251 and a part of conductor 230, the circuit including the master timer contacts 233 and 234. With this arrangement, electromagnet 250 is normally energized and is deenergized each time contact 234 is moved away from contact 233. Connected to bell crank lever 249 is a spring 252 which tends normally to move the bell crank lever against a stop pin 253. When bell crank lever 249 is in the position shown in Fig. 11, electromagnet 250 being energized, worm wheel 248 is held in mesh with a gear 254 mounted on a shaft 255. When electromagnet 250 is deenergized, spring 252 pulls bell crank lever 249 into engagement with stop pin 253. This lifts worm wheel 248 out of mesh with gear 254. Electromagnet 250 thus functions as a means for connecting and disconnecting synchronous disk motor 245 to and from gear 254. Fixed on shaft 255 and to gear 254 so as to turn therewith is an arm 256 which is normally pulled toward a stop pin 257 by a spring 258. Arm 256 is adapted to open a circuit closer 259 located in conductor 230 in series with circuit closer 231 of the master timer. The movable contact of circuit closer 259 is carried by a spring finger 260 which is adapted to be moved by arm 256 into engagement with a fixed stop 261. The gear ratio between motor 245 and gear 254 is such that during one complete revolution of worm wheel 238 of the master timer, gear 254 moves arm 256 from stop pin 257 to a point just short of spring finger 260. Each time pin 239 of the master timer opens circuit closer 231, electromagnet 250 is deenergized, permitting worm wheel 248 to move from mesh with gear 254. When this occurs, spring 258 moves arm 256 back into engagement with stop pin 257. When circuit closer 231 closes again, electromagnet 250 is energized to bring worm wheel 248 back into mesh with gear 254, whereupon arm 256 again starts to move in a direction to open circuit closer 259. As long as the master timer continues to function properly, opening circuit closer 231 each revolution, arm 256 is continuously moved toward circuit closer 259 and released just before it starts to open circuit closer 259. In case the master timer stops with circuit closer 231 closed, then motor 245 will continue to drive gear 254, bringing arm 256 into engagement with spring strip 260, thereby opening circuit closer 259 and deenergizing the brake magnets 207 of all the circuit controllers. This permits each of the circuit controllers to continue to operate independently of the master timer and of the other circuit controllers. When arm 256 brings spring strip 260 into engagement with stop 261, further movement of gear wheel 254 is prevented. Motor 245 continues to operate, the friction clutch 246 slipping.

In some instances it may be desirable, in case the main or master timer fails, to substitute an auxiliary or spare timer in its place until the main timer is repaired. To accomplish this, a change over switch for disconnecting the main timer from the system and substituting a spare timer may be placed under the control of the protective relay so that when it operates due to the failure of the main timer, the auxiliary timer is substituted for the main timer. This is illustrated in Fig. 11 wherein V indicates an auxiliary timer which may be similar to the main timer and which may be substituted for it by the operation of switch W. Switch W is actuated by a solenoid X the winding of which is connected to lines 188 and 189 by conductors Y and Z which include the stop 261 which under these conditions functions also as a contact. With this arrangement, when spring strip 260 engages stop contact 261, solenoid X is energized and switch W is moved to disconnect the main timer and connect into circuit the auxiliary timer V. The arrangement is such that, having been moved by solenoid X to connect auxiliary timer V in circuit, switch W remains in such position. It may be reset manually after the main timer has been repaired.

The master timer or controller may be similar generally to the circuit controllers, except that it requires no contact drum and is modified to provide the circuit closer 231 and the actuating pin 239 therefor. It is provided with ratchets 262 and 263, and pawls 264 and 265, corresponding to ratchets 145 and 146 and pawls 147 and 148 of the circuit controller, and also with actuating electromagnets 266 and 267 for the pawls. Also, it comprises a disk (not shown) corresponding to disk 157 and a pointer 268 corresponding to pointer 165ª, for indicating at the central station the adjustment of the gear ratio and the "Fire", "Flash" and "Off" positions. An operator at the central station actuating the circuit closers 186 and 187 has before him the adjustment of all the circuit controllers of the system.

In changing the gear ratio of the circuit controllers, or in adjusting the circuit controllers for "Fire", "Flash" or "Off" position, it is desirable to provide means to hold the master timer behind the circuit controllers, for if it gets ahead of the circuit controllers then it will open the circuit closer 231 and stop all the controllers for practically a complete cycle. To avoid this, there is provided a retarding means for the master timer which functions to delay its operation somewhat. In the present instance this is in the form of a locking means for the motor disk 236 of the master timer. The locking means comprises a bell crank locking lever 269 having an end adapted to engage the disk of the motor and an end which forms the armature of an electromagnet 270. When electromagnet 270 is energized it brings an arm of the locking lever into engagement with the disk to stop the motor. Electromagnet 270 is connected in circuit with a circuit closer 271 adapted to be closed by either of the electromagnets 272 or 273 when either is energized. At 274 is indicated a dash pot or other similar means which delays slightly the opening movement of circuit closer 271 after it has been closed by either of the electromagnets 272 or 273. Electromagnet 272 is connected in parallel with pawl actuating electromagnet 267 and electromagnet 273 is connected in parallel with pawl actuating electromagnet 266. With this arrangement, when either electromagnet 267 or electromagnet 266 is energized to turn ratchet 263 or 262, circuit closer 271 is simultaneously closed and held closed for a predetermined time, depending on the adjustment of dash pot 274, thereby energizing electromagnet 270 and stopping motor disk 236 for a predetermined interval of time. This interval of time is sufficient to insure the changing of the gear ratio of the several circuit controllers before the master timer is against started. The time delay need not be great, it being sufficient only to prevent the master timer from getting ahead of the several circuit controllers while the gear ratio at the several circuit controllers is changing.

By our invention, we have provided what may be termed a universal circuit controller, in that it may be used alone as an individual unit, such a use being met within the case of isolated intersections of streets or roads; it may be used in conjunction with other similar circuit controllers, the several circuit controllers being phased relatively to each other with their synchronous driving motors connected to a common power system, but not actually interconnected with a master timer, such a use being met with in connection with a non-interconnected progressive signaling system for controlling traffic on streets or roads; or it may be used in conjunction with other similar circuit controllers, the several circuit controllers being connected with a master timer or controller, such a use being met with in the case of interconnected progressive systems for controlling traffic on streets or roads. For each of these uses, the circuit controller need not be changed, it being simply connected up for the use to which it is intended to be put. This is of importance from a manufacturing and commercial standpoint. Also, it is of importance from the standpoint of the user in that it enables the same circuit controller to be readily adapted to take care of any operating conditions met with.

In the case of an isolated intersection, the circuit controller may be located at any suitable point, either directly at the intersection or remote therefrom as found desirable. The push button control for manually operating the signals and the push button control for changing the gear ratio and for "Fire", "Flash" and "Off" positions likewise may be located at any suitable point, either directly at the intersection or remote therefrom. The automatic resynchronizing mechanism comprising the locking magnet 207 and the reset mechanism comprising the reset magnets 221 and 222 would not be used and connections to them would be omitted.

By adjusting the segments of the cams 52 any desired color sequences and combinations can be obtained. By using cam segments of different circumferential length and by adding cams to the circuit controller drum and corresponding teeth to the ratchet which turns the drum, together with the necessary circuit connections, the controller can be adapted readily for a three street intersection or other street arrangement. Knowing the nature of the intersection, it becomes necessary only to adjust the cam segments for the color sequences and combinations required to control most efficiently the traffic at the intersection. Cams comprising six segments as shown in the drawing are capable of adjustment to take care of operating conditions met with ordinarily.

By adjusting the keys 29 in the slots 33, the "split" of the color combinations can be made anything desired. That is, any given total time cycle may be divided as found desirable by adjusting the keys. As shown in Fig. 2, the face of plate 31 may carry suitable indicia for indicating the division of the cycle. For example, indicia showing the percentage of "split" may be used. The keys form a quick and convenient adjusting means and one whereby a fine adjustment may be obtained.

By shifting the gears 12, 13 the length of the time cycle can be adjusted quickly at any time. This adjustment is independent of the adjustment for dividing the time cycle, which means that great flexibility is obtained in the adjustment of the length of the time cycle and its division. By being able to adjust the cams 167 and 168 which control the "Fire", "Flash" and "Off" positions, relatively to the gear ratio, the advantage is obtained that for any particular installation the cams 167 and 168 may be adjusted to a position wherein the fewest number of steps will be required to bring the cams to operative position. For most installations only a certain limited number of gear ratios will be required and the cams 167 and 168 may be set directly adjacent the one extreme gear ratio.

It will be noted that the "Fire", "Flash" and "Off" cams form a part of the gear shifting mechanism. This has the advantage that additional cable conductors are not required for the "Fire", "Flash" and "Off" signals since they are controlled from the central station over the cable conductors used for shifting the gears.

The use of synchronous motors for driving the circuit controllers is important since it means that several circuit controllers may be operated in progressive phase relation by being connected to a common power system, and that in the case of interconnected circuit controllers controlled by a master timer, if the master timer fails the circuit controllers continue to operate in phase relation.

When a number of circuit controllers are used in a non-interconnected system, which may be a progressive system, each is independently adjusted and set relatively to the other, to give the desired relative timing of the signals. With such a system, if found desirable, push button controls for the resynchronizing mechanisms comprising the locking magnets 207 and for the reset mechanisms comprising the reset magnets 221 and 222, may be arranged at a control station so that all the signals may be manually controlled. Also push button control for all the gear ratio changing mechanisms may be arranged at the control station. In such a case, all the circuit controllers may be adjusted simultaneously for "Fire", "Flash" and "Off" positions.

When a number of circuit controllers are used in an interconnected system, which may be a progressive system, all the circuit controllers are connected in parallel to a master timer or controller after the manner disclosed in Fig. 11. This gives complete automatic control as already described.

In accordance with the provision of the patent statute, we have described the principle of operation of our invention, together with the apparatus which we now consider to represent the best embodiment thereof; but we desire to have it understood that the apparatus shown is only illustrative and that the invention may be carried out by other means.

What we claim as new and desire to secure by Letters Patent of the United States, is:

1. In a circuit controller, the combination of a rotating circuit closer, means for effecting actuation of the circuit closer, a movable circuit controller member, current responsive means connected to said circuit closer and operated at each actuation thereof for effecting movement of the circuit controller member, lock means for rendering said current responsive means inoperative in case a predetermined timed relation between said circuit closer and said circuit controller member does not obtain, manual control means for said circuit controller member, and means for disconnecting said current responsive means from said rotating circuit closer and connecting it to said manual control means and for rendering said lock means inoperative.

2. A circuit controller comprising a continuously rotating shaft, circuit closing means, means connecting the said shaft to the circuit closing means for effecting periodic actuation of the said circuit closing means, a rotating circuit controller member, means including an electrically operated device in circuit with the circuit closing means for rotating the circuit controller member, a locking member for the electrically operated device biased toward locking position, means for holding it away from locking position, means carried by the rotating circuit controller member for periodically releasing said holding means, and means carried by the continuously rotating shaft for preventing movement of the locking member when released if the rotating shaft and rotating circuit controller are in a predetermined timed relation relatively to each other.

3. In a signaling system, the combination of a plurality of signaling devices, a circuit controller member, electric circuits connecting the signaling devices to the circuit controller member, means including a rotating circuit closer for effecting movement of the circuit controller member, an electric motor, change speed gearing connecting the electric motor to the rotating circuit closer, means including a shaft for changing said gearing, movable contact means for disconnecting said signaling devices from said circuit control member, and means carried by said shaft for actuating said movable contact means.

4. In a signaling system, the combination of a plurality of signaling devices, a circuit controller member, electric circuits connecting the signaling devices to the circuit controller member, means including a rotating circuit closer for effecting movement of the circuit controller member, an electric motor, change speed gearing connecting the electric motor to the rotating circuit closer, means including a shaft for changing said gearing, movable contact means for disconnecting said signaling devices from said circuit control member, means carried by said shaft for actuating said movable contact means, and means for adjusting said last named means on the shaft.

5. In a signaling system, the combination of a plurality of signaling devices, a circuit controller member, electric circuits connecting the signaling devices to the circuit controller member, driving means for the circuit controller member including change speed mechanism for driving said circuit controller at a selected one of a plurality of predetermined speeds, means for operating the change speed mechanism from a distance to select one of said predetermined speeds including a movable operating mechanism, and means for disconnecting the circuit controller from the signaling devices operated by the change speed operating mechanism when it is moved to a certain position.

6. In a signaling system, the combination of a plurality of signaling devices, a circuit controller member, electric circuits connecting the signaling devices to the circuit controller member, driving means for the circuit controller member including change speed mechanism which may be operated step by step to effect a predetermined speed of operation of said circuit controller at each step, mechanism for operating said change speed mechanism step by step, means for actuating the step by step operating mechanism from a distance, and means operated by said operating mechanism for disconnecting the signaling devices from the circuit controller member at a certain position of said step by step mechanism.

7. In a signaling system, the combination of a plurality of signaling devices, a circuit controller member, electric circuits connecting the signaling devices to the circuit controller member, driving means for the circuit controller member, other circuits for the signaling devices, means for disconnecting the circuit controller from the signaling devices, change speed mechanism for said driving means operable step by step to effect a predetermined speed of operation of said circuit controller at each step, step by step actuating mechanism for said change speed mechanism, means for actuating the step by step mechanism from a distance, means operated by said mechanism for disconnecting the signaling devices from the circuit controller member at a certain position of said step by step mechanism, and means for changing the certain position at which such disconnection occurs.

8. In a signaling system, the combination of a plurality of signaling devices, a circuit controller member, electric circuits connecting the signaling devices to the circuit controller member, driving means for the circuit controller member, means for disconnecting the circuit controller from the signaling devices, change speed mechanism for said driving means operable step by step to effect a predetermined speed of operation of said circuit controller at each step, mechanism for operating said speed change mechanism step by step, means for actuating the step by step mechanism from a distance, other circuits for said signaling devices, means operated by said step by step mechanism for disconnecting the signaling devices from the circuit controller member at one certain position of said step by step mechanism, and means operated by said step by step mechanism for connecting said signaling devices to said other circuits at another certain position of said step by step mechanism.

9. In a signaling system, the combination of a plurality of signaling devices, a circuit controller member, electric circuits connecting the signaling devices to the circuit controller member, driving means for the circuit controller member, other circuits for the signaling devices, change speed mechanism for said driving means, mechanism for operating said change speed mechanism step by step, means for actuating the step by step mechanism from a distance, means operated by said step by step mechanism for disconnecting the signaling devices from the circuit controller member at one certain position of said step by step mechanism, means operated by said step by step mechanism for connecting said signaling devices to said other circuits at another certain position of said step by step mechanism, and means for adjusting the certain positions relatively to said step by step mechanism.

10. In a signaling system, the combination of a plurality of signaling devices, a circuit controller member, electric circuits connecting the signaling devices to the circuit controller member, means including a rotating circuit closer for effecting movement of the circuit controller member, an electric motor, change speed gearing connecting the electric motor to the rotating circuit closer, a longitudinally movable shaft for changing said gearing, a gear for moving said shaft longitudinally, ratchet and pawl means for imparting step-by-step movement to said gear, other circuits for the signaling devices, movable contact means for disconnecting said circuit controller member from said signaling devices and for connecting said signaling devices to said other circuits, means moved by the ratchet and pawl means for actuating said movable contact means, and means for actuating said ratchet and pawl means from a remote point.

11. In a signaling system, in combination, a plurality of circuit controllers each comprising a driving motor, a circuit controller member and change speed gearing connected between the driving motor and the circuit controller member, a master timer to which said circuit controllers are connected in parallel, means controlled by said master timer for maintaining the circuit controllers in phase relation relatively to each other, means for changing the change speed gearings, and means responsive to operation of the gear changing means for retarding the master timer while the gearings are being changed.

12. In a signaling system, in combination, a plurality of circuit controllers each comprising a driving motor, a circuit controller member and change speed gearing connected between the driving motor and the circuit controller member, a master timer to which said circuit controllers are connected in parallel, means controlled by said master timer for maintaining the circuit controllers in phase relation relatively to each other, and electrically operated means for simultaneously retarding said master controller and changing the change speed gearings.

13. In a signaling system, the combination of a plurality of signaling devices, a circuit controller member, electric circuits connecting the signaling devices to the circuit controller member, driving means for the circuit controller member including change speed mechanism for operating said circuit controller member at any one of a plurality of predetermined speeds, operating mechanism for said change speed mechanism movable to select any one of said predetermined speeds, other circuits for said signaling devices, and means for disconnecting the circuit controller from the signaling devices and connecting the signaling devices to said other circuits, said means being operated by the said operating mechanism when its occupies a certain position.

14. In a signaling system, the combination of a plurality of signaling devices, a circuit controller member, electric circuits connecting the signaling devices to the circuit controller member, other circuits for said signaling devices, driving means for the circuit controller member including change speed mechanism for effecting operation of said controller at any one of a plurality of predetermined speeds, operating means for the change speed mechanism including a movable operating mechanism movable from a distance for effecting operation of said circuit controller member at a predetermined one of said speeds, and means for connecting said signaling devices to said controller member operated by the change speed operating mechanism when it occupies a certain position and operated to connect them to said other circuits when the said operating mechanism occupies a certain other position.

15. In a signal system, the combination of a master controller, a circuit controller provided with a motor, a circuit closer operated by said motor, means for momentarily closing said circuit closer during its operation at variable intervals in a recurring cycle, a drum controller, means for advancing said drum controller to a different position at each actuation of said circuit closer, means for maintaining said drum controller in a definite operating relation with said circuit closer, and means for maintaining a predetermined phase relation between said master controller and said circuit closer.

16. In a traffic-signal system, the combination of a master controller, a circuit controller provided with a motor, a circuit closer operated by said motor over a predetermined path, means for momentarily closing said circuit closer at irregular intervals during its operation comprising a series of adjustable keys arranged in said path, a drum controller, means for advancing said drum controller to a different position at each actuation of said circuit closer, means for maintaining said drum controller in a definite operating relation with said circuit closer, and means for maintaining a predetermined phase relation between said master controller and said circuit closer.

17. In a traffic signal controller the combination of a base, a panel, said panel being provided with a circularly arranged series of spaced openings at substantially right angles to the plane of the panel face, circuit closing means including a circuit closer member, means for effecting relative rotation between said circuit closer member and said openings on an axis concentric with the center of the spaced openings and in a plane substantially parallel to said panel whereby keys inserted in selected ones of said openings will be engaged by said circuit closer member to close a circuit a number of times in accordance with the number of keys employed.

18. In a traffic signal controller the combination of a base, a panel, said panel being provided with a circularly arranged series of spaced openings at substantially right angles to the plane of the panel face, circuit closing means including a circuit closer member, means for rotating said member on an axis concentric with the center of the spaced openings and in a plane substantially parallel to said panel whereby keys inserted in selected ones of said openings will be engaged by said circuit closer member to close a circuit a number of times corresponding to the number of keys employed.

19. In a traffic signal controller the combination of a base, a panel, said panel being provided with a circularly arranged series of spaced openings, circuit closing means including a circuit closer member, means for effecting relative rotation between said circuit closer member and said openings on an axis concentric with the center of the spaced openings and in planes substantially parallel to said panel, and keys in said openings projecting toward said circuit closer member for engaging the latter to close a circuit in accordance with the spacing of said keys and the rate of movement between said keys and said circuit closer member.

20. In a traffic signal controller the combination of a base, a panel, said panel being provided with a circularly arranged series of spaced radial slots at substantially right angles to the panel face, circuit closing means including a circuit closer member, means for effecting relative rotation between said circuit closer member and said slots on an axis concentric with the center of said slots and in substantially parallel planes whereby keys inserted in selected ones of said slots will be engaged by said circuit closer member to close a circuit a number of times in accordance with the number of keys employed.

21. In a traffic signal controller the combination of a base, a panel, said panel being provided with a circularly arranged series of spaced openings at substantially right angles to the panel face, a circuit closer member, a circuit controller member mounted on said base, means for operating said circuit controller member step by step to change the signaling circuits at each movement thereof responsive to actuations of said circuit closer member and means for effecting relative rotation between said circuit closer member and said openings on an axis concentric with the center of said openings and in substantially parallel planes whereby keys inserted in selected ones of said openings will actuate said circuit closer member to effect a step by step movement of said circuit controller member in accordance with the number of keys employed.

22. In a traffic signal controller the combination of a base, a panel, said panel being provided with a circularly arranged series of spaced openings, circuit closing means including a circuit closer member, means for rotating said circuit closer member on an axis concentric with the center of said spaced openings and in a plane parallel to said panel, a circuit controller member mounted on said base, means for moving said circuit controller member step by step responsive to actuations of said circuit closer member, keys in certain of said openings projecting toward said circuit closer member for engaging said circuit closer member and effecting actuation thereof during the rotation of said circuit closer member and means for maintaining the circuit closer in a definite operating relation relative to the circuit controller member.

23. In a traffic signal controller the combination of a base, a panel, said panel being provided with a circularly arranged series of spaced openings, a circuit closing means including a circuit closer member, means for rotating said circuit closer member on an axis concentric with the center of said spaced openings, and in a plane substantially parallel to said panel, a circuit controller member mounted on said base, means for rotating said circuit controller member step by step responsive to actuations of said circuit closer member, keys in certain of said openings projecting toward said circuit closer member for engaging said circuit closer member and thereby effecting actuation thereof during rotation of said circuit closer member and means responsive to a variation from a predetermined operating relationship between said circuit closer member and said circuit controller members for rendering said circuit controller rotating means temporarily ineffective.

24. In a traffic signal controller the combination of a base, a panel, said panel being provided with a circularly arranged series of spaced openings substantially normal to said panel, circuit closing means including a circuit closer member, means for rotating said circuit closer member on an axis concentric with the center of said spaced openings and in a plane substantially parallel to said panel, a circuit controller member mounted on said base, means for rotating said circuit controller member step by step responsive to actuations of said circuit closer member, keys in certain of said openings for engaging said circuit closer member and thereby effecting actuations thereof during rotation of said circuit closer member, lock means controlled by the circuit controller member which periodically tends to render last said rotating means inoperative, and means controlled by the circuit closer member for periodically rendering said lock means inoperative.

25. In a traffic signal controller the combination of a base, a panel, said panel being provided with a circularly arranged series of spaced openings at substantially right angles to the panel face, a circuit closer member, a circuit controller member mounted on said base, means for operating said circuit controller member step by step to change the signaling circuits at each movement thereof responsive to actuations of said circuit closer member and means for effecting relative rotation between said circuit closer member and said openings on an axis concentric with the center of said openings and in substantially parallel planes whereby keys inserted in selected ones of said openings will actuate said circuit closer member to effect a step by step movement of said circuit controller member in accordance with the positioning of said keys in said openings and the rate of said relative rotation between said circuit closer and said openings.

ARTHUR B. CAMPBELL.
CLAUDE F. BEYER.